United States Patent
De Carli

(10) Patent No.: US 7,905,539 B2
(45) Date of Patent: Mar. 15, 2011

(54) VARIABLE-GEOMETRY VESSEL FOR TRANSPORT VEHICLE

(76) Inventor: Jean-Claude De Carli, Chateauneuf de Grasse (FR)

( * ) Notice: Subject to any disclaimer, the term of this patent is extended or adjusted under 35 U.S.C. 154(b) by 66 days.

(21) Appl. No.: 12/447,724

(22) PCT Filed: Sep. 28, 2007

(86) PCT No.: PCT/EP2007/060284
§ 371 (c)(1),
(2), (4) Date: Apr. 29, 2009

(87) PCT Pub. No.: WO2008/052852
PCT Pub. Date: May 8, 2008

(65) Prior Publication Data
US 2010/0060025 A1    Mar. 11, 2010

(30) Foreign Application Priority Data
Oct. 31, 2006    (FR) ...................................... 06 54679

(51) Int. Cl.
*B62D 25/20*    (2006.01)
(52) U.S. Cl. .................................. 296/184.1; 296/26.13
(58) Field of Classification Search ............... 296/26.13, 296/184.1; 298/13, 18; 239/657, 663
See application file for complete search history.

(56) References Cited

U.S. PATENT DOCUMENTS

| 2,870,923 | A |   | 1/1959 | Jewell |
| 3,245,714 | A |   | 4/1966 | Blair |
| 4,580,843 | A | * | 4/1986 | Lund ............................... 298/18 |
| 4,698,087 | A | * | 10/1987 | Hirt ................................. 65/172 |
| 5,588,711 | A | * | 12/1996 | Hall ................................ 298/18 |
| 6,814,396 | B2 | * | 11/2004 | Greer et al. ................. 296/183.2 |
| 7,111,907 | B2 | * | 9/2006 | Boon ............................. 298/18 |

FOREIGN PATENT DOCUMENTS

| DE | 24 52 660 | 5/1976 |
| DE | 78 00 399 | 4/1978 |

OTHER PUBLICATIONS

International Search Report dated Jan. 24, 2008, from corresponding PCT application.

* cited by examiner

*Primary Examiner* — Lori L Lyjak
(74) *Attorney, Agent, or Firm* — Young & Thompson

(57) ABSTRACT

Vessel (1) for a goods transport vehicle comprising two side walls (2) and a base (3), characterized in that it comprises means for the transverse movement (4) of the side walls (2) relative to the base (3). Advantageously, the means of transverse movement (4) are designed to move the bottom edges (5) of the side walls (2) in order to change the shape of the vessel from a basically rectangular shape to a basically U shape or vice versa. The present invention applies particularly to the transportation of bulk materials or made-up goods.

11 Claims, 2 Drawing Sheets

VARIABLE-GEOMETRY VESSEL FOR TRANSPORT VEHICLE

BACKGROUND OF THE INVENTION

Figure 1:
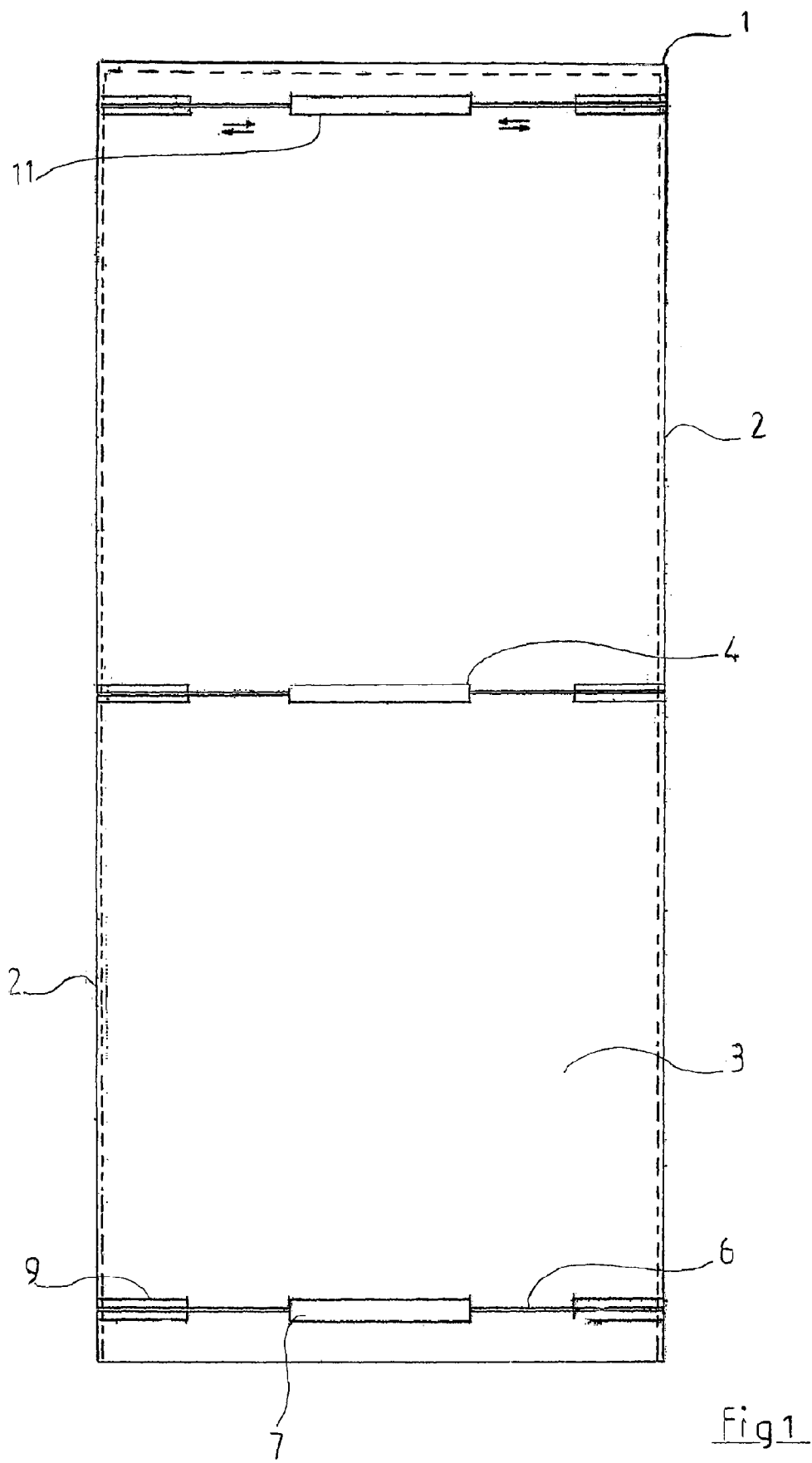

The present invention concerns a vessel for use on a goods transport vehicle with a back, one-side or two-side tipping commonly called a tipper, a two-way tipper or a three-way tipper.

It will be used in particular for the transport of materials or goods in all the road haulage, agricultural, forestry, construction fields, etc. . . . . .

DESCRIPTION OF THE RELATED ART

Prior art on skips for vehicles transporting bulk materials is known. The walls of these skips have a progressive incurvation hereafter called U-shape. The incurvation of the walls has the advantage of centring the bulk materials in the skip and this facilitates in particular material unloading.

Fixed or removable vessels for the transport of goods or conditioned materials on pallets or in easily storable form are also known. These vessels have a roughly parallelepiped shape.

In particular, document DE7800399, which discloses a rear platform for a transport truck on which the lower parts of the walls can be slightly pushed back towards the outside in order to facilitate the insertion of the vessel on the flat platform, is known. Similarly, document U.S. Pat. No. 3,245,714 describes a platform of a truck that can be increased in length. The vertical walls move in their entirety perpendicular to the base of the platform.

Therefore, there is a need for these two transport vessels in order to transport bulk materials and made-up goods.

On construction sites, there is a need for vessels transported by trucks or trailers in order to bring construction products onto the site and also have available skips transported by trucks to remove rubble.

This generates additional costs and requires considerable work to manage the various types of vehicles.

Hence, there has a reason and need for a vessel of variable geometry for use on transport vehicles that can be adapted to the transport of bulk material and the carriage of made-up goods.

SUMMARY OF THE INVENTION

To this end, the invention proposes a vessel consisting of a goods vehicle with two side walls and a base, characterised in that it has the means for transverse movement of the side walls relative to the base from a roughly perpendicular position to a position in which the lower edges of the side walls are brought closer together and vice versa.

This invention has the advantage of proposing a two-in-one transport vessel.

In fact, the side walls of the aforesaid vessel can be moved, their inclination modified to change from a vessel with roughly rectangular shape to one with roughly U shape.

Thus, the transport vehicle can be used to bring made-up goods onto the building site in the form of a roughly rectangular-shaped vessel and then transformed into a roughly U-shaped vessel for the removal of rubble.

Hereafter, the term goods is used in the broadest sense to cover materials in bulk or made-up goods or others.

Advantageously, it is the lower edges of the said side walls of the said vessel that move transversely.

The function of the means for transverse movement is to tilt the said side walls so that the vessel changes from a rectangular shape to a U shape.

Other goals and advantages will appear in the description of a preferred embodiment, which is not restrictive.

It should be remembered that the invention proposes a vessel for use on goods transport vehicles comprising two side walls and a base characterised in that it has means for transverse movement of the lower edges of said side walls so as to tilt side walls from a roughly perpendicular position to a position in which lower edges of side walls are brought closer together and vice versa.

According to preferred variations of the invention, the said vessel is such that it has means for transverse movement of the lower edges of said side was so as to tilt side walls from a roughly perpendicular position to a position in which lower edges of side walls are brought closer together and vice versa.

said means for transverse movement are placed roughly perpendicular relative to side walls.

said means for transverse movement include at least one rod actuated by activation means.

actuating means are double-acting hydraulic cylinders.

said means for transverse movement coact with side walls in their lower parts.

said side walls include in their lower part a connecting element designed to coact with said transverse movement means.

said transverse movement means are located under the base of said vessel.

base is provided with openings to allow transverse movement of side walls relative to base.

each side wall is moved by at least two transverse movement means so as to distribute the displacement force.

said tilting and sliding means consist of a hole placed in the upper part of stake able to receive a tenon situated in the upper part of side walls.

it comprises stakes able to co-act in their upper parts with side walls through tilting and sliding means.

BRIEF DESCRIPTION OF THE DRAWING FIGURES

The attached drawings are given as examples and are not restrictive. They show only one embodiment of the invention and enable it to be easily understood.

FIG. 1: View of the underside of the vessel

Figure 2:
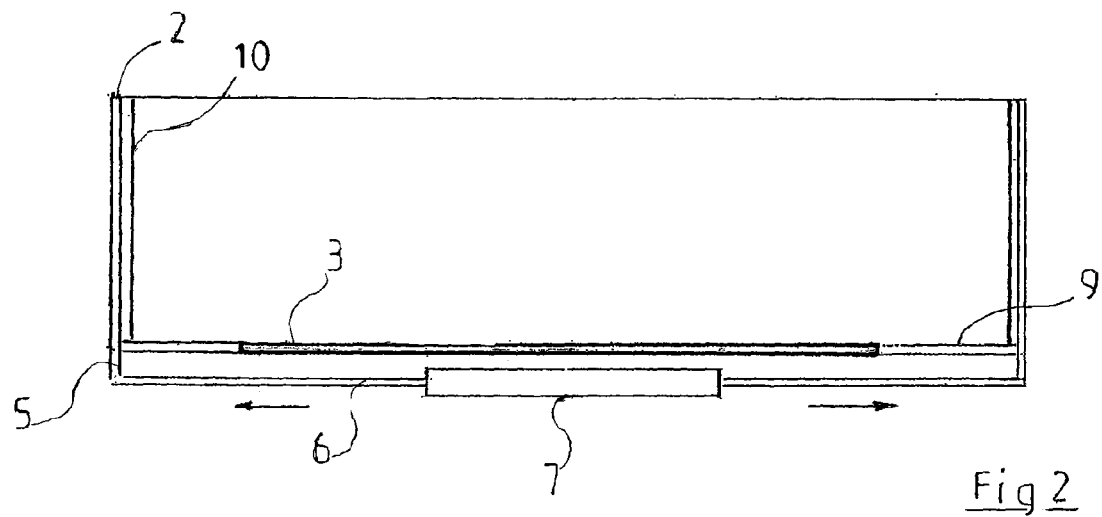

FIG. 2: Sectional view of the vessel in a roughly rectangular configuration

Figure 3:
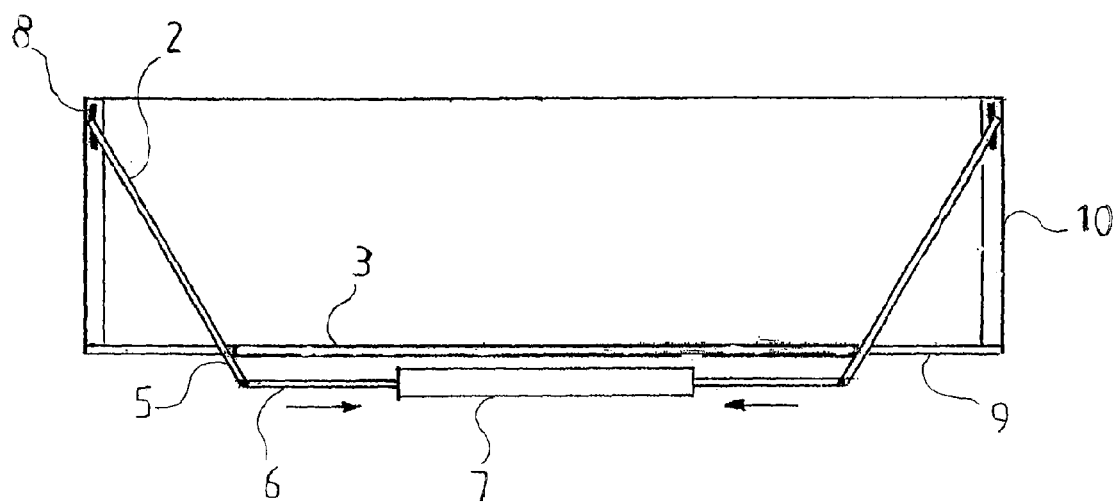

FIG. 3: Sectional view of the truck in a roughly U-shaped configuration.

DETAILED DESCRIPTION OF THE PREFERRED EMBODIMENTS

The invention concerns a vessel 1 for the transport of goods comprising two side walls 2 and a base 3 characterised in that it has means for transverse movement 4 of side walls 2 relative to base 3.

Advantageously, said displacement means 4 are designed to bring lower edges 5 of said side walls 2 closer together transversely.

The transverse movement of lower edges 5 of said side walls 2 tilts said side walls 2 so that vessel 1 of roughly rectangular shape is transformed into a vessel of roughly U-shape or vice versa.

According to one embodiment, said means for transverse movement 4 are positioned roughly perpendicular to side wall 2.

Advantageously, said means for transverse movement 4 are placed under base 3 of said vessel 1.

According to one embodiment, said means for transverse movement 4 include a rod 6 actuated by actuating means 7.

Advantageously, said rod 6 co-acts through one of its edges with side walls 2 in their lower part and by the other edge with actuating means 7.

Advantageously, said rod 6 is roughly parallel to said base 3.

According to one embodiment, said side walls 2 include in lower part 5 a connecting element that is designed to co-act with said means for transverse movement 4.

The connecting element is designed to connect two side walls 2 and rod 6 of the means for transverse movement 4.

Advantageously, said base 3 of said vessel 1 is equipped with openings 9 to allow transverse movement of side walls 2 relative to base 3.

Indeed, transverse movement means 4 are situated under base 3 and co-act with side walls 2 situated above bottom 3. Base 3 is provided with openings 9 to allow passage of rod 6 and/or connecting element and/or side walls 2.

According to one embodiment, said openings 9 are closed by a removable floor.

According to one embodiment, said actuating means 7 are double-acting hydraulic cylinders.

Advantageously, double-acting hydraulic cylinder 11 is placed under base 3 of said vessel 1 and roughly parallel to it. A rod 6 exits from double-acting hydraulic cylinder 11 and co-acts with the lower edge of side walls 2, advantageously by a connecting part. When double-acting hydraulic cylinder 11 is actuated, it modifies the actuating length of rod 6 so as to bring lower edge 5 of side wall 2 to the centre of vessel 1, or to move it away.

This transverse movement of lower edge 5 of side wall 2 causes the wall to tilt or returns it to the vertical position.

According to one embodiment, each side wall 2 is moved by at least two double-acting hydraulic cylinders that distribute the force required for the movement. There may be two lateral hydraulic cylinders and a central cylinder as shown.

According to one embodiment, said vessel 1 includes stakes 10 able to co-act with side walls 2 in the upper part through tilting means.

Advantageously, said tilting means consist of a hole 8 placed in the upper part of said stakes 10 able to receive a tenon situated in the upper part of said side walls 2 to form a pivot fitted in a slide.

According to another embodiment, vessel 1 has a front panel that can be fixed or removable.

According to another embodiment, a rear panel can be added. Said rear panel can be removable and be a conventional 90° upward opening panel or any other known means.

According to one embodiment, side walls 2 are removable and can be positioned in the same plane as base 3 by a hydraulically or manually-operated cylinder for application to a two-way tipper or three-way Upper and according to the tonnage of the vehicle.

According to the size of vessel 1, there may be two or several side walls 2 per side.

Advantageously, side walls 2 are then fixed on one or more central stakes 10.

Said vessel 1 is adaptable so that it will fit on any type of goods vehicle and can be fixed or tilting, in particular for dumping use.

REFERENCES

1. Vessel
2. Side walls
3. Base
4. Movement means
5. Lower edge
6. Rod
7. Actuating means
8. Hole
9. Openings
10. Stakes
11. Hydraulic cylinder

The invention claimed is:

1. Vessel (1) for use on goods transport vehicles comprising two side walls (2) and a base (3), comprising:
    means for transverse movement of the lower edges of said side walls (2) so as to tilt side walls (2) from a roughly perpendicular position to a position in which lower edges of side walls (2) are brought closer together and vice versa.

2. Vessel (1) according to claim 1 characterised in that said means for transverse movement (4) are placed roughly perpendicular relative to side walls (2).

3. Vessel (1) according to claim 1 characterised in that said means for transverse movement (4) include at least one rod (6) actuated by activation means (7).

4. Vessel (1) according to claim 3 characterised in that said activation means (7) are double-acting hydraulic cylinders (11).

5. Vessel (1) according to claim 1 characterised in that said means for transverse movement (4) coact with side walls (2) in their lower parts (5).

6. Vessel (1) according to claim 1 characterised in that said side walls (2) include in their lower part (5) a connecting element designed to coact with said transverse movement means (4).

7. Vessel (1) according to claim 1 characterised in that said transverse movement means (4) are located under the base (3) of said vessel (1).

8. Vessel (1) according to claim 1 characterised in that base (3) is provided with openings (9) to allow transverse movement of side walls (2) relative to base (3).

9. Vessel (1) according to claim 1 further comprising stakes (10) able to co-act in their upper parts with side walls (2) through tilting and sliding means.

10. Vessel (1) according to claim 9 characterised in that said tilting and sliding means consist of a hole (8) placed in the upper part of stake (10) able to receive a tenon situated in the upper part of side walls (2).

11. Vessel (1) according to claim 1 characterised in that each side wall (2) is moved by at least two transverse movement means (4) so as to distribute the displacement force.

* * * * *